March 23, 1965 C. C. AUEL 3,175,048

DIALING DEVICE FOR DIAL-OPERATED SYSTEMS

Filed Oct. 12, 1961 3 Sheets-Sheet 1

INVENTOR.
CARL C. AUEL

BY

Murray & Young his ATTORNEYS

DIALING DEVICE FOR DIAL-OPERATED SYSTEMS
Filed Oct. 12, 1961 3 Sheets-Sheet 2
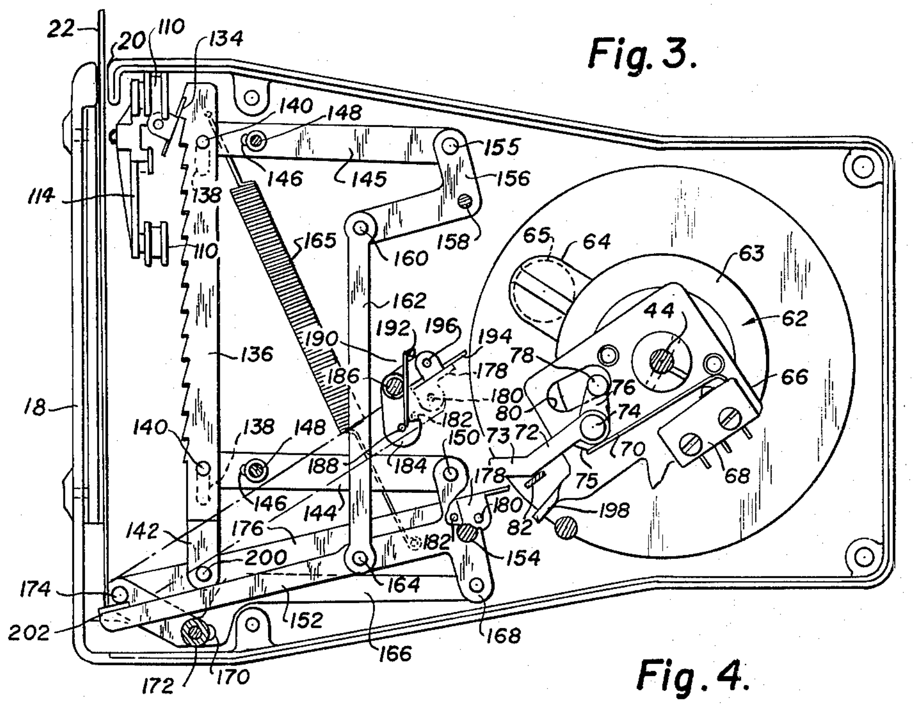
Fig. 3.
Fig. 4.
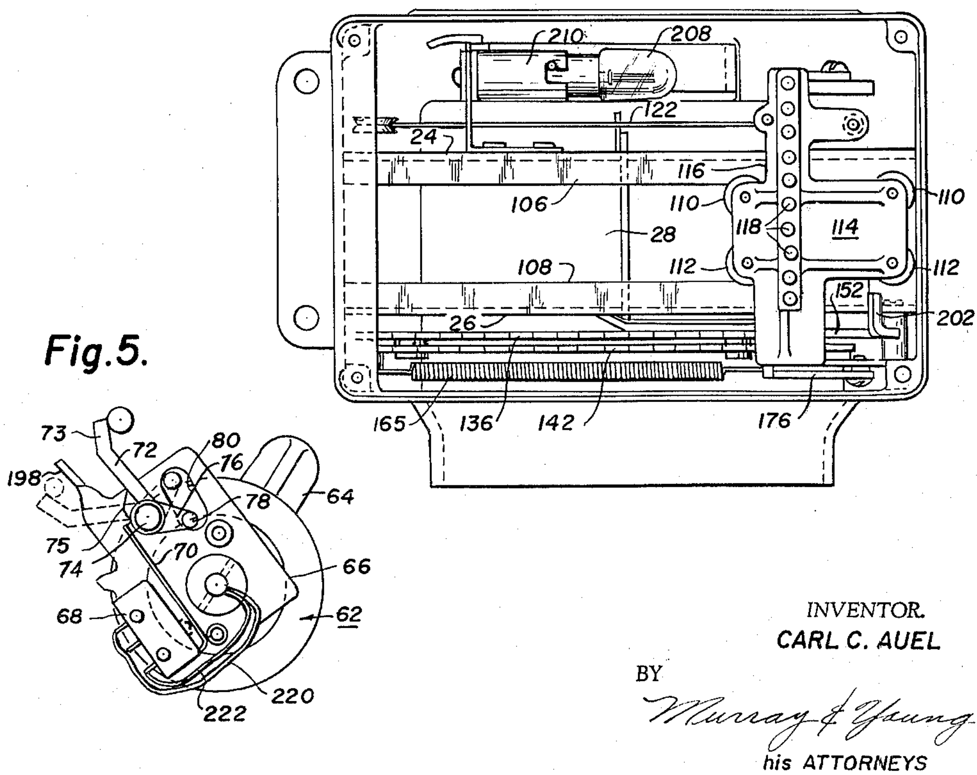
Fig. 4. Fig. 5.
INVENTOR.
CARL C. AUEL
BY
Murray & Young
his ATTORNEYS

DIALING DEVICE FOR DIAL-OPERATED SYSTEMS

Filed Oct. 12, 1961

3 Sheets-Sheet 3

INVENTOR.
CARL C. AUEL
BY
Murray & Young
his ATTORNEYS

United States Patent Office 3,175,048
Patented Mar. 23, 1965

3,175,048
DIALING DEVICE FOR DIAL-OPERATED SYSTEMS

Carl C. Auel, 1200 8th Ave., Irwin, Pa.
Filed Oct. 12, 1961, Ser. No. 144,708
11 Claims. (Cl. 179—90)

This invention relates to apparatus for automatically operating a dial-controlled system such as a dial telephone, and more particularly to operating apparatus of the type described which can be controlled by either punch card scanning apparatus or by means of manually operable pushbuttons.

As is known, the conventional dial-controlled system such as a dial telephone utilizes a rotary dial having a plurality of circumferentially spaced openings therein, the arrangement being such that the forefinger of the user may be inserted into an opening representing a digit or letter in a telephone number to be called and the dial rotated to a stop position and then released. Another type of telephone, called a pushbutton telephone, was recently introduced for use. This type of telephone, unlike the conventional dial type, is provided with a plurality of pushbuttons each of which represents a digit or letter in a telephone number to be called. The pushbutton system is, of course, much faster than the dial arrangement in that a number may be reached by merely depressing the appropriate pushbuttons in sequence, thereby eliminating the delay time occasioned with a dial system each time the dial returns to its starting position following the dialing of a particular digit or letter in the number to be called.

The present invention is concerned primarily with dial-controlled systems and has as one of its objects the provision of means for converting a dial-controlled system into a pushbutton-controlled system. In this manner, at least some of the advantages of the bushputton system may be obtained without installing an entirely new pushbutton equipment.

Another object of the invention is to provide apparatus for automatically operating a dial-controlled system by the use of a card member and electrical card scanning apparatus, the card member having electrically detectable means thereon representing indicia in a telephone number or the like, and the scanning apparatus being adapted to sequentially detect the electrically detectable means on the card to control the apparatus for dialing a telephone number by actuation of motor driven dial-engaging means. Previous to this invention, card-operated systems have been proposed for automatically operating dial-type telephones; however all of these previous devices are extremely complicated and not altogether satisfactory. The present invention, on the other hand, provides a card or tape operated system for dial telephones which is simple, compact and economical in construction.

Another object of the invention is to provide apparatus for automatically operating dial telephones and the like which can be readily moved from phone-to-phone and instantly removed from the phone and replaced.

A further object of the invention is to provide a single unit which can be selectively used either for operating a dial telephone by card scanning apparatus or by the use of pushbuttons incorporated into the unit. Thus, in contrast to previous card devices for operating dial telephones wherein the unit had to be removed from the telephone handset when it was desired to dial a number manually, the present invention provides a means whereby a number may be dialed manually by the use of pushbuttons incorporated into the unit without the necessity for removing the unit from the telephone dial.

The above and other objects and features of the invention will become apparent from the following detailed description taken in connection with the accompanying drawings which form a part of this specification, and in which:

FIG. 3 is a cross-sectional view taken along line III—III of FIG. 1;

FIG. 4 is an end view taken substantially along line IV—VI of FIG. 2;

FIG. 5 is a detailed top view of the limit switch means and switch actuating mechanism carried on the rotary dial-engaging means of the invention.

Figure 1:
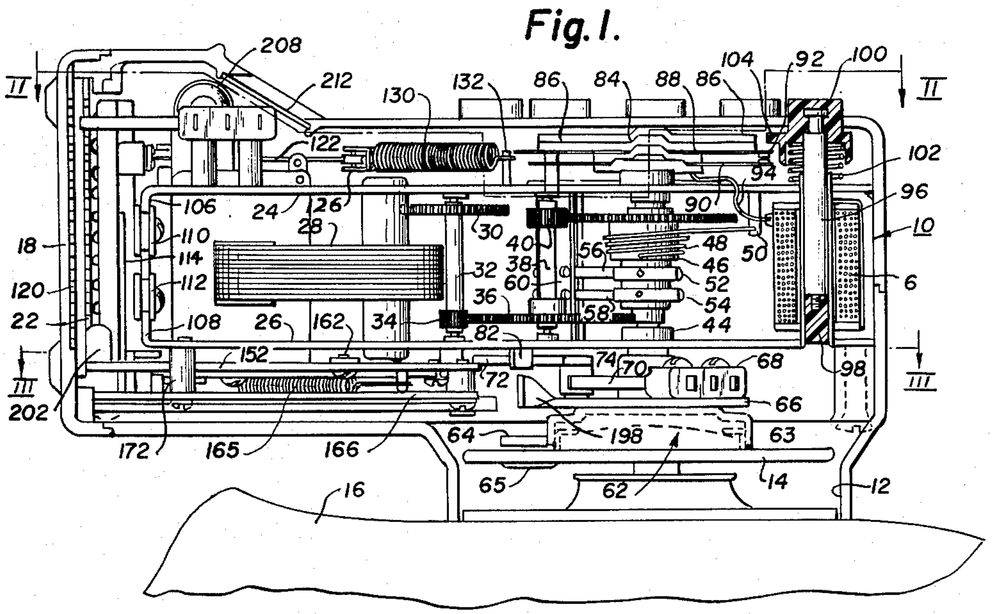
FIGURE 1 is a cross-sectional side view of the apparatus of the invention.
Figure 2:
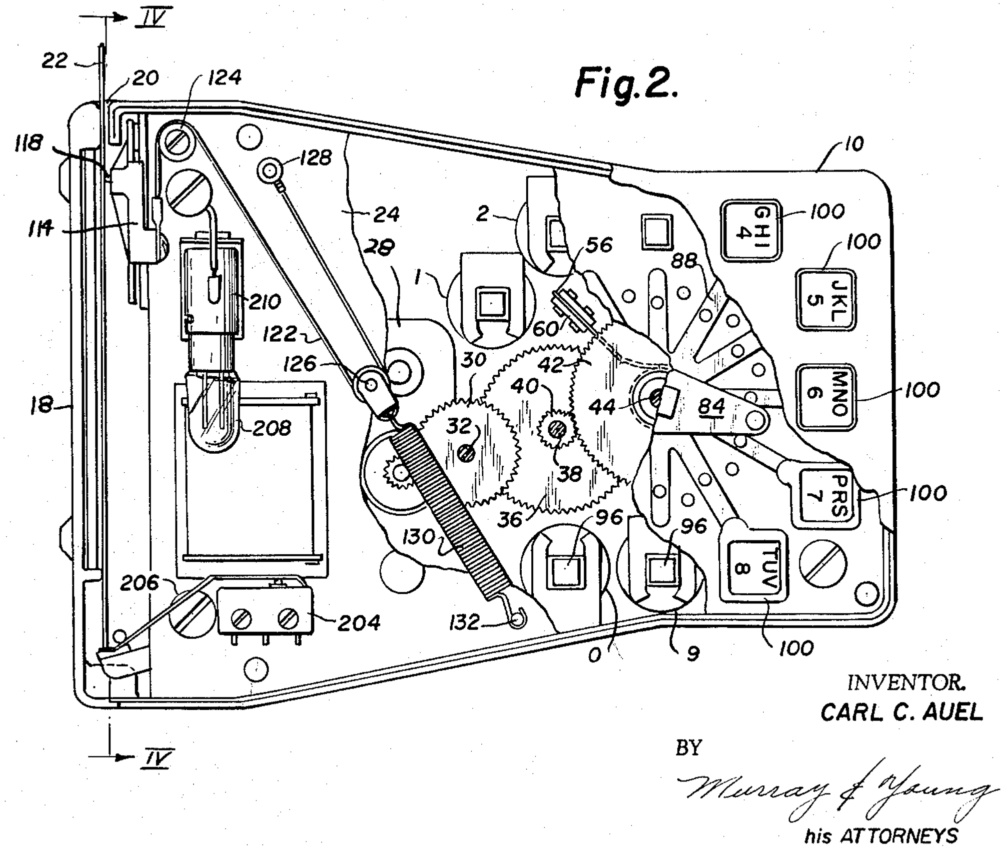
FIG. 2 is a partially broken-away top view of the apparatus shown in FIG. 1, taken susbtantially along line II—II of FIG. 1.

Referring now to the drawings, and particularly to FIGS. 1 and 2, the telephone dialing device of the invention comprises an outer housing or casing 10 having a circular flared opening 12 on its lower side adapted to fit over the dial 14 of a conventional telephone handset, generally indicated at 16. An adjustable leg or other means, not shown, will normally be provided to support the left end of the casing, as shown in FIG. 1, which extends out over the telephone handset 16. The left end of casing 10 as viewed in FIG. 1 is provided with a removable cover 18 having a slot 20 (FIG. 2) at one edge provided for the reception of a punch card 22.

Carried within the casing 10 between the side walls thereof are spaced parallel plates 24 and 26. Carried between the plates 24 and 26 is an electric motor 28 having a drive shaft, not shown, which engages a gear 30 on shaft 32 also extending between the plates 24 and 26. At the lower end of shaft 32 is a pinion gear 34 which meshes with a gear 36 on a second shaft 38 which also extends between the plates 24 and 26. At the upper end of shaft 38 is a pinion gear 40 which meshes with a drive gear 42 on the main drive shaft 44 for the telephone dial rotating apparatus, hereinafter described in detail. The motor 28 is equipped with a magnetic clutch, not shown, which will automatically engage when the motor is energized and disengage when the motor is deenergized. As will be seen, this feature permits the shaft 44 and its associated gears to be easily rotated in the opposite direction when the motor is deenergized without overcoming the inertia of the motor armature.

Also provided on the main drive shaft 44 is a hub 46 having a coil spring 48 wound therearound. One end of the coil spring is secured to the hub 46 while the other end is secured to a pin 50 extending downwardly from plate 24, substantially as shown. Beneath the hub 46 are electrical slip rings 52 and 54 which are in engagement with leaf spring brushes 56 and 58, respectively, these brushes being supported on the plate 26 by means of bracket 60.

Secured to the bottom of shaft 44 is rotary dial-engaging means 62 (FIGS. 3 and 5) comprising a cup-shaped portion 63 which fits over the center portion of the telephone dial and an arm 64 secured to the cup-shaped portion. As best shown in FIG. 1, the arm 64 is provided with a downwardly-extending button 65 which fits into the last or zero opening in the telephone dial. In this regard, the arm 64 may be angularly adjusted about the shaft such that the casing 10 may be positioned over the telephone at any desired angle. Carried above the member 62 on shaft 44 is a plate 66 (FIGS. 3 and 5) which carries a normally closed limit switch 68. Also provided on the plate 66 is switch actuating means for limit switch 68 comprising a spring 70 and a lever arm 72 which is pivotally connected to the plate 66 as at 74, the forward end 73 of arm 72 being bent forwardly to accommodate the rectangular configuration of solenoids, hereinafter described, which are spaced around shaft 44. As shown, the lever arm 72 has an arm 76 connected thereto; and at the end of arm 76 is a pin 78 which extends downwardly into an elongated limiting slot 80 in plate 66. When the lever 72 is rotated in a counterclockwise direction from the position shown in FIG. 3 a cam surface 75 thereon will press against the spring 70 to open the normally closed limit switch 68. The position of the lever 72 in its counterclockwise position is shown by the dotted outline in FIG. 5. The lever 72 will be rotated in a counterclockwise direction when it engages any one of a plurality of solenoid armatures, hereinafter described in detail; whereas it will be rotated in clockwise direction back into its original position as shown in FIG. 3 when it engages a tab 82 which depends downwardly from plate 26 as best shown in FIGS. 1 and 3.

Carried on plate 24 above the main drive shaft 44 are a plurality of stationary stacked insulating spacers 84. The two upper spacers are elongated as shown in FIG. 2 and serve to secure the assembly to the plate 24 by means of elongated screws 86. Secured between two of the insulating spacers 84 is an upper spider 88 of electrical conducting material having ten circumferentially spaced arms thereon which extend outwardly toward the openings in the dial 14 corresponding to the indicia in a telephone number to be called. Carried between two of the insulating spacers 84 beneath the spider 88 are radial arms 90 of electrical conducting material, only one of such arms being shown in FIG. 1. Each of the arms 90 is directly beneath a corresponding arm of the spider 88 and is electrically insulated by the spacers 84 from the remaining arms. The extermities of the arms on the spider 88 and arms 90 are provided with contact points 92 (FIG. 1) such that a circuit will be completed between the spider 88 and any one of the individual arms 90 when the contact points 92 for that particular set of arms is closed. Each arm 90 is, in turn, connected through an associated lead 94 to one of ten solenoids circumferentially spaced around the axis of the main drive shaft 44. As shown, the solenoids are numbered 1 through 0 and are each carried between the plates 24 and 26 along axes extending parallel to the axis of the main drive shaft 44. Carried within each of the solenoids 1–0 is an armature 96 having a plastic insert 98 secured to its lower end. Secured to the upper end of each of the armatures 96 is a plastic pushbutton 100; and between the pushbutton 100 and the plate 24 is a coil spring 102 which urges the pushbutton and the armature 96 upwardly into the position shown in FIG. 1. When the pushbutton 100 is depressed, however, a radially-inwardly extending projection 104 on that pushbutton will engage the spider 88 to close contacts 92, thereby completing a circuit through lead 94 to energize its corresponding solenoid 1–0.

With particular reference to FIGS. 1 and 4, it will be noted that the left ends of plates 24 and 26 as viewed in FIG. 1 are bent inwardly to provide a pair of tracks 106 and 108 for the reception of insulating rollers 110 and 112, respectively. The rollers 110 and 112 are provided on a carriage 114 of electrical conducting material which carries a scanning bar 116 having ten spring-loaded electrical contact points 118 thereon, the contact points being spring biased outwardly from the plane of the drawing as viewed in FIG. 4. To the left of the contact points 118 as viewed in FIG. 1 are ten parallel electrical conducting bars 120 which are separated by interleaved bars of electrical insulating material. As will be understood, the space between the contact points 118 and the bars 120 is adapted for reception of the punch card 22. In accordance with usual practice, the punch card is perforated at various points along its length from left to right as viewed in FIG. 4 so that as the carriage 114 moves from left to right, selected ones of the contact points 118 will make electrical contact with associated ones of the bars 120 as the contact points pass over perforations in the card. The upper end of the carriage 114 is secured, as shown in FIGS. 2 and 4, to a flexible metallic cable conductor 122 which passes around insulating pulleys 124 and 126 and is secured to the upper plate 24 by means of an upwardly-extending insulating pin 128 such that the carriage 114 and cable 122 are electrically insulated from the remainder of the apparatus. The pulley 126 is connected to one end of a coil spring 130, the other end of which is anchored to the plate 24 by means of an upstanding pin 132. Thus, the spring 130 will normally pull the carriage 114 to the left as viewed in FIG. 4.

The carriage 114 may be moved to the right as viewed in FIG. 4 in successive equal increments by a pawl and ratchet mechanism including two pivoted pawls 134 (FIG. 3) positioned one above the other on the back of carriage 114, only the top pawl being shown in the drawings. The lower pawl, not shown, is adapted to engage a lower ratchet bar 142 (FIG. 4) provided with slots 138 (FIG. 3) which permit the bar to move backwardly or forwardly on pins 140 (FIG. 3) extending downwardly from an upper, non-reciprocating ratchet bar 136. The non-reciprocating ratchet bar 136. The non-reciprocating bar 136 above the reciprocable ratchet bar 142 has serrations therein which are adapted to engage the upper pivoted pawl 134 on carriage 114. Thus, in order to move the carriage 114 from left to right as viewed in FIG. 4, the reciprocable ratchet 142 may be first moved to the left as viewed in FIG. 4 and thereafter moved in the opposite direction to the right, thereby advancing the upper pawl 134 from one serration in the upper ratchet bar 136 to the serration immediately to its right. In this manner, the carriage 114 will be moved in successive steps to the right as viewed in FIG. 4 as the lower ratchet bar 142 is reciprocated, the spring 130 maintaining the carriage 114 under tension at all times. In order to return the carriage 114 from its extreme right position as viewed in FIG. 4 to its initial starting position as viewed in FIG. 3, the ratchet bars 136 and 142 may both be moved to the right as viewed in FIG. 3 to thereby clear the pawls 134 and permit the carriage 114 to be returned to its initial starting position under the influence of spring 130.

In order to move the ratchet bars 136 and 142 backwardly in order that they will clear the pawls 134, means including a pair of push-pull bars 144 and 145 are provided. Each bar 144 and 145 is provided with a slot 146 slidable on a pin 148 extending downwardly from the lower plate 26. The bar 144 is pivotally connected as at 150 to a generally T-shaped lever 152, this latter lever being pivotally connected to the underside of plate 26 as at 154. The bar 145, on the other hand, is pivotally connected as at 155 on an L-shaped lever 156, this latter lever being pivotally connected to the underside of plate 26 as at 158. The opposite leg of the lever 156 is pivotally connected as at 160 to a crossbar 162, the other end of the crossbar being pivotally connected as at 164 to the main shank portion of the T-shaped lever 152 is normally urged to rotate in a clockwise direction about pivot 154 as viewed in FIG. 3 by means of a coil spring 165 having one end connected to the lever 152 and its opposite end connected to the lower reciprocable ratchet bar 142.

Connected to the end of the crossbar of T-shaped lever 152 opposite pivot point 150 is a reciprocable bar 166, this bar having a pivotal connection to the crossbar of lever 152 as at 168. Bar 166 is provided with a slot 170 which slides on a pin 172 depending downwardly from the lower plate 26. The end of bar 166 opposite pivot point 168 is pivotally connected as at 174 to an actuating lever 176 having a pawl 178 pivotally connected to its forward end as at 180. Just behind the pawl 178 on lever 176 is an upstanding pin 182 adapted to engage a latch 184 which is pivotally connected to a pin 186 depending downwardly from plate 26. The latch 184 is generally L-shaped in configuration and is provided at its one end with a hole 188 which engages the downwardly bent end of coil spring 190, this coil spring being wound about the pin 186 and having its opposite end engaging a pin 192 depending downwardly from the plate 26. With the arrangement shown, the spring 190 will urge the latch 184 to rotate in a counterclockwise direction. On one end of the latch 184 is a pawl 194 rotatable about a pivot point 196. As will be understood, the pawl 194 may rotate in a counterclockwise direction from the position shown in FIG. 3, but it cannot rotate in a clockwise direction by virtue of the fact that it engages the latch 184.

Provided on the plate 66 carried on the dial-engaging means 62 is an upstanding projection 198 (FIGS. 1 and 3). With the actuating lever 176 in the position shown, rotation of main drive shaft 44 and the plate 66 in a clockwise direction as viewed in FIG. 3 will cause the projection 198 to engage the pawl 178, thereby causing the actuating lever 176 to rotate in a counterclockwise direction about pivot point 174 into the broken line position shown where the pin 182 engages latch 184. The actuating lever 176, being pivotally connected to the reciprocable ratchet bar 142 as at 200 causes that ratchet bar to move upwardly as viewed in FIG. 3. The projection 198 will pass over the pawls 194 and 178 as it continues rotation in a clockwise direction; and as will be seen the movement of the projection 198 in order to cock the lever 176 so that it engages the latch 184 is that required for the telephone to dial the first indicia or a "1." In order to rotate the projection 198 in a clockwise direction, it is necessary for the motor 28 to be energized. When however, the motor is deenergized the spring 48 will rotate the projection 198 in a counterclockwise direction, and when that projection reaches the pawl 194 it will rotate the latch 184 in a clockwise direction, thereby permitting the pin 182 to pass over the latch; whereupon the actuating lever 176 is returned to its initial starting position urged by the tension coil spring 165 attached to reciprocating bar 142 which, in turn, urges actuating lever 176 in a clockwise direction to the position shown in full lines in FIG. 3 preparatory to the dialing of the next successive number in a telephone number. As was stated above, the motor 28 is provided with a magnetic clutch which disengages when the motor is deenergized and the spring 48 rotates the shaft 44 in a counterclockwise direction as viewed in FIGS. 2 and 3. This is of primary importance since otherwise the spring would have to overcome the inertia of the motor armature in addition to the other moving elements of the apparatus. As an alternative, however, a reversing motor could be used, in which case the spring 48 would be eliminated and the shaft 44 returned to its original starting position under the force of the motor.

Referring now to the lever 152, it will be noted that its one end is provided with an upstanding projection 202 adapted to engage the end of the punch card 22 when it is inserted into the slot 20. When the punch card 22 is thus inserted into slot 20 it will push the projection 202 downwardly as viewed in FIG. 3, thereby causing the T-shaped lever 152 to pivot in a counterclockwise direction about the pivot point 154. This causes the bar 144 to move from right to left as viewed in FIG. 3, thereby moving the lower end of the ratchet bars 136 and 142 into engagement with pawl 134 on carriage 114. In a similar manner, rotation of lever 152 in a counterclockwise direction about pivot point 154 causes the L-shaped lever 156 to pivot in a counterclockwise direction about pivot 158 due to the downward movement of crossbar 162. Such counterclockwise rotation of the lever 156, in turn, moves bar 145 and the upper end of the ratchets 136 and 142 from right to left as viewed in FIG. 3, thereby moving the upper end of the ratchet bars into engagement with the pawls 134. Although described as if the opposite ends of the ratchet bars 136 and 142 move separately, it will be understood that both ends of the ratchet bars are moved toward the pawl 134 simultaneously.

Rotation of the lever 152 in a counterclockwise direction about pivot point 154 also causes the reciprocable bar 166 to move from left to right as viewed in FIG. 3, thereby causing the actuating lever 176 to move from left to right. When, however, the card is removed from the slot 20, the lever 152 will rotate in the opposite direction, thereby causing bar 166 and lever 176 to move from right to left as viewed in FIG. 3 where the projection 198 will no longer engage the pawl 178, meaning that the lever 176 will not be cocked or rotated in a counterclockwise direction about pivot point 174 upon rotation of projection 198 on the dial-engaging means 62. At the same time, when the card 22 is removed from slot 20, rotation of lever 152 in a clockwise direction about pivot point 154 will move bar 144 from left to right as viewed in FIG. 3. In addition, the lever 156 will be rotated in a clockwise direction to likewise move bar 145 from left to right. This moves both of the ratchet bars 136 and 142 out of engagement with the pawls 134 on carriage 114, thereby permitting the carriage to be returned to its initial starting position under the effect of coil spring 130. Thus, whenever a card is inserted into slot 20 such that its forward end engages the projection 202 on lever 152 to rotate this lever in a counterclockwise direction as viewed in FIG. 3, the forward end of lever 176 and the pawl 178 will be moved into position where it can engage projection 198 on dial-engaging means 62 whereby the lever 176 will be cocked each time the dial-engaging means 62 rotates in a clockwise direction as viewed in FIG. 3. When, however, the card 22 is removed from the slot 20 the lever 152 will rotate about pivot point 154 under the influence of spring 165 in a clockwise direction, thereby moving the forward end of lever 176 and pawl 178 out of range of the projection 198 while simultaneously moving the ratchet bars 136 and 142 backwardly to permit the carriage 114 to be returned to its initial starting position.

With reference now to FIG. 2, it will be noted that mounted on the upper plate 24 is a limit switch 204 having a spring actuating lever 206 adapted to be engaged by the end of a card 22 inserted into slot 20. The assembly is completed by means of a pilot lamp 208 which is inserted into a socket 210. As shown in FIG. 1, the pilot lamp 208 illuminates a colored translucent or transparent plate 212 provided in the top of casing 10 to indicate that the equipment is operating and to illuminate the ten pushbuttons. This lamp could also be used to illuminate the buttons from the bottom if they are made of clear plastic or glass-like material.

Figure 6:
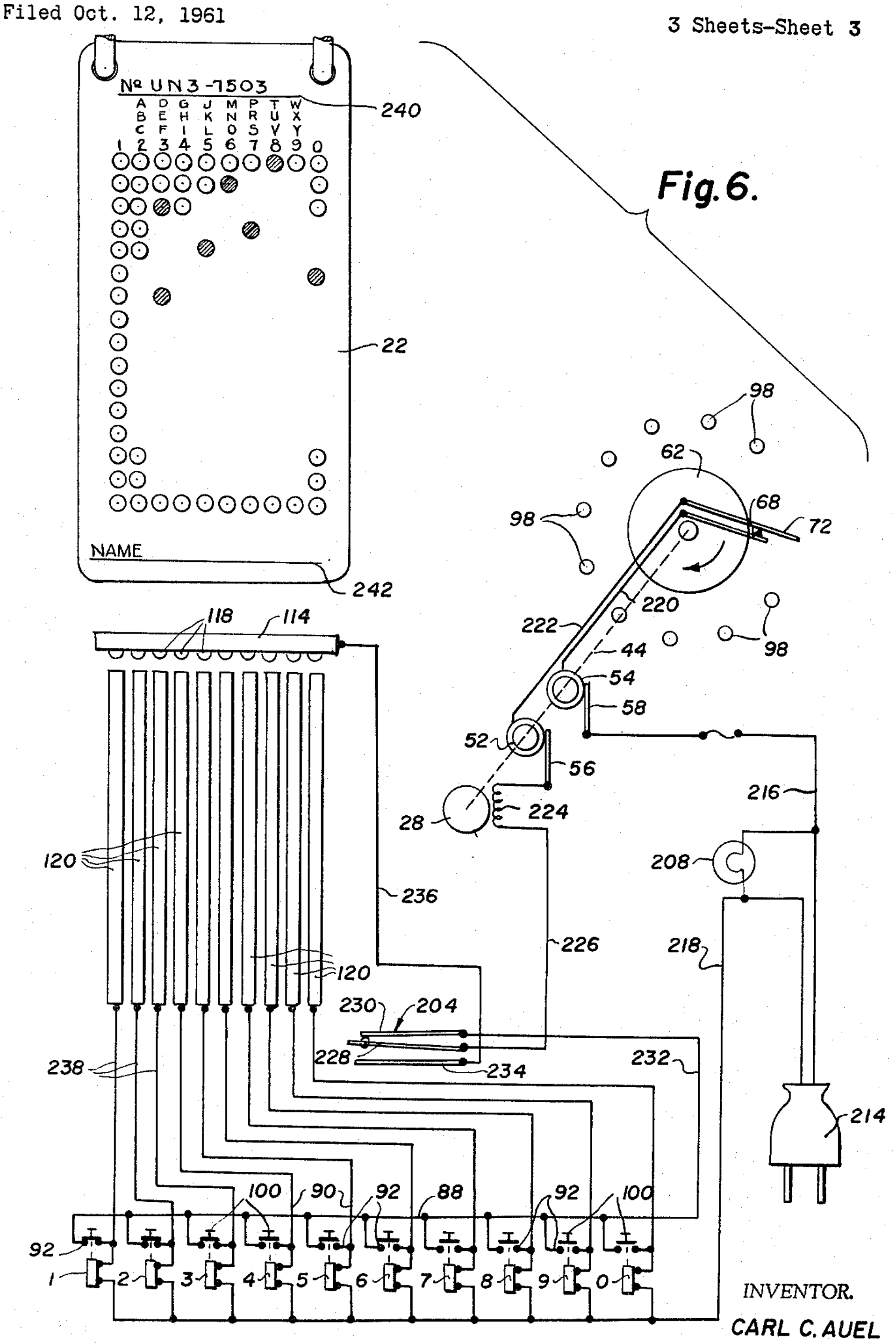
FIG. 6 is a schematic circuit diagram of the circuitry incorporated into the telephone dialing device of the invention.

Operation of the invention may best be understood by reference to FIG. 6, taken in connection with the other figures of the drawings. Assuming that the casing 10 is placed over the telephone so that cover 18 faces the user and the numerals on pushbuttons 100 are imprinted as in FIG. 2, arm 64 will be fixed in a position rotated about 90° counterclockwise from the position shown in FIG. 3 so that it fits into the zero (i.e., "operator") opening on the dial 14. Power for the automatic telephone dialing device is supplied by means of a conventional wall plug 214 (FIG. 6) adapted to be inserted into a 110 volt household electrical outlet. One of the leads 216 from plug 214 is connected to the brush 58 on slip ring 54; whereas the other lead 218 from plug 214 is connected to one side of each of the solenoids 1–0 circumferentially spaced around the main drive shaft 44. Slip ring 54 is, in turn, connected through lead 220 (see also FIG. 5) to one terminal of the normally closed limit switch 68 on rotary dial-engaging means 62. The other terminal of limit switch 68 is connected through lead 222 (see also FIG. 5) to the second slip ring 52, this slip ring being connected through brush 56 to one terminal of the field winding 224 for motor 28. The other terminal of the field winding 224 is then connected through lead 226 to the movable contact element 228 of limit switch 204. In the position of limit switch 204 shown, the movable contact member 228 will engage stationary contact 230 which, in turn, is connected through lead 232 to the spider 88, this spider being indicated by a common lead connected to each of the contacts 92 in FIG. 6. The position of the limit switch 204 illustrated in FIG. 6 is that which it assumes when no card is inserted into slot 20. When, however, a card is inserted into the slot 20, it will engage the lever 206 (FIG. 2) to cause the movable contact 228 to engage stationary contact 234. This contact, in turn, is connected through lead 236 to all of the contact points 118 on the carriage 114 which is insulated from the remainder of the apparatus. Each of the conducting strips 120 is connected through an associated one of the leads 238 to one of the conducting arms 90 (FIG. 1), such conducting arms being schematically illustrated as leads in FIG. 6.

As was mentioned above, the present invention may be employed either as a means for operating a dial telephone by the use of pushbuttons or by the use of a punch card. Considering, first, pushbutton operation, let us assume, for example, that the telephone number 4–7891 is to be dialed. The wall plug 214 will, of course, be initially plugged into a wall receptacle; however the motor 28 will not be energized due to the fact that the circuit to field winding 224 is not completed through any one of the contacts 92 on the solenoids 1–0. When the number 4–7891 is to be dialed the pushbutton 100 for the No. 4 solenoid is initially pressed. When this occurs, a circuit is completed to the field winding 224 for motor 28, thereby causing the motor to rotate the main shaft 44 in a clockwise direction as viewed in FIGS. 2 and 3. At the same time, a holding circuit is provided for the No. 4 solenoid through contacts 92 for that solenoid, lead 232 and limit switch 204 which now connects the lead 232 to lead 226. As was mentioned above, when none of the pushbuttons 100 are depressed, the switch actuating lever 72 on plate 66 (FIG. 1) will not engage any of the lower ends 98 of the armatures 96. When, however, a pushbutton is depressed and is held depressed by energization of its associated solenoid in the manner described above, the actuating lever 72 will engage the lower plastic end 98 of that solenoid to open the normally closed limit switch 68. In the case where the No. 4 pushbutton was depressed, the motor 28 will rotate the dial-engaging means 62 and the actuating lever 72 until it reaches the No. 4 solenoid where the lower end 98 of the armature for this solenoid will engage the actuating lever 72 to open limit switch 68. When limit switch 68 is thus opened, the circuit to both motor 28 and the No. 4 solenoid is broken. Thus, the armature for the No. 4 solenoid will spring or pop upwardly under the influence of spring 102 while the coil spring 48 will rotate the main drive shaft 44 and the dial-engaging means 62 in a counterclockwise direction as viewed in FIGS. 2 and 3. This action will continue until the actuating lever 72 strikes projection 82 (FIG. 3) to stop further counterclockwise rotation. Due to the fact that at this time a card is not inserted in the slot 20, the actuating lever 176 and its pawl 178 are moved backwardly out of the path of travel of projection 198 on plate 66 such that the mechanism shown in FIG. 3 for actuating the ratchet bars 136 and 142 is inoperative.

As the dial-engaging means 62 was rotated before striking the armature for the No. 4 solenoid, it was advanced through a number of degrees corresponding to the number of degrees of travel of the No. 4 opening in a telephone dial to the finger-stop position. Thus, a No. 4 was dialed in this manner as in the conventional manual method. Thereafter, in dialing the number 4–7891 the No. 7, 8, 9 and 1 pushbuttons are depressed in sequence and the foregoing operation repeated. Thus, to use the invention as a pushbutton phone the operator simply pushes the correct button in the proper sequence for the particular number being called but must wait until the dial has returned to 0 each time before the next button is pushed. This has the advantage that not only can a number be called by pushing buttons, but the device need not be removed from its position over the phone to call numbers when the card is not being used.

Operation of the system with a punch card will now be described. With reference to FIG. 6 the card 22 is provided with a line 240 for the number to be called. In this case we will assume that the number is UNderhill 3–7503. At the bottom of the card is a second line 242 provided for the name of the individual or concern whose telephone number is on line 240. In the example given, the card is provided with sixteen rows of circular partially pre-cut knockout holes, each row having ten knockout holes extending transversely across the width of the card in aligned columns. Any one of these holes may be punched out of the card with a pencil or other sharp instrument in a well known manner to provide a perforation therein.

As shown, the columns of circular holes extending along the long dimensions of the card 22 (i.e., from top to bottom) are identified by the numerals 1–0 as well as appropriate letters identifying indicia in a telephone number to be called. For the case where the number UNderhill 3–7503 is to be called, the eighth hole in the first row representing the letter U, the sixth hole in the second row representing the letter N, the third hole in the row representing the digit 3 and so on will be punched out of the card 22 to provide the pattern of perforations shown by the hatched lines in FIG. 6. The remaining rows or holes may be used, if necessary, for additional codes or indicia for a particular number, such as long distance codes.

When the card 22 is inserted into slot 20 (FIG. 2), it will engage the actuating lever 206 for limit switch 204 as well as the projection 202 on the T-shaped lever 152. In this manner, the lever 152 will be rotated about pivot point 154 in a counterclockwise direction as viewed in FIG. 3 to move both of the ratchet bars 136 and 142 into engagement with the pawls 134 on carriage 114. At the same time, movement of bar 166 from left to right as viewed in FIG. 3 will also move the actuating lever 176 to the right and into position where the pawl 178 will be engaged by projection 198 on plate 66 when the drive shaft 44 on dial-engaging means 62 is rotated in a clockwise dirction.

When the card 22 is fully inserted into the slot 20 and the limit switch 204 reversed from the position shown in FIG. 6, the contact points 118 will be directly over the first row of holes in the card 22. Due to the fact, however, that only the No. 8 position is punched out of the card in the first row, a circuit will be completed between lead 236 and the No. 8 solenoid to energize the solenoid while simultaneously energizing motor 28 to rotate the dial-engaging means 62 and plate 66 in a clockwise direction. As the plate 66 rotates in a clockwise direction in this manner, the projection 198 will engage the pawl 178 and cause the actuating lever 176 to rotate in a counterclockwise direction about pivot point 174 until it engages the latch 184. In this process, the lower ratchet bar 142 is moved upwardly as viewed in FIG. 3, thereby advancing one serration on this bar over the lower pawl 134 on carriage 114. The motor 28 and dial-engaging means 62 will continue to rotate until the lever 72 strikes the lower end 98 of the No. 8 solenoid which is now energized at this time. At this point, the normally closed limit switch 68 will be opened, thereby breaking the circuit to motor 28 and the No. 8 solenoid. Switch 68 remains open during this time to break the circuit to motor 28 until lever 72 strikes the projection 82 (FIG. 3). Consequently, the spring 48 will return the dial-engaging means and the plate 66 to their original positions by counter-clockwise rotation as was the case with pushbutton operation. In this case, however, when the projection 198 on plate 66 strikes the pawl 194 it will disengage the latch 84 from the upstanding pin 182 on actuating lever 176. Consequently, the actuating lever 176 now springs back to its original position shown by the full lines in FIG. 3. In this process, it causes the lower ratchet bar 142 to move downwardly, thereby carrying the carriage 114 and the contact points 118 to the second row on the card 22. When the carriage 114 is thus advanced, a circuit will be completed through the No. 6 solenoid and the foregoing process is repeated until the entire number is dialed. When the card 22 is removed from slot 20, the lever 152 rotates in a clockwise direction about pivot point 154 thereby moving the ratchet bars 136 and 142 away from the pawls 134 to permit the carriage 114 to be returned to its original starting position.

Although the invention has been shown in connection with a certain specific embodiment, it will be readily apparent to those skilled in the art that various changes in form and arrangement of parts may be made to suit requirements without departing from the spirit and scope of the invention. In this respect, it is apparent that parallel operating circuits could be substituted for the series circuit shown in FIG. 6.

I claim as my invention:

1. An automatic dialing device for dial-operated systems comprising rotary dial-engaging means, motor means adapted to drive said dial-engaging means in one direction, spring means urging said dial-engaging means in the opposite direction, switch means on the rotary dial-engaging means, a plurality of stop devices circumferentially spaced around the axis of said rotary dial-engaging means, each of said stop devices having a first position in which it will engage the switch means upon rotation of the dial-engaging means and a second position in which it will not engage the switch means, and circuit means for energizing said motor means and including said switch means, the arrangement being such that the circuit to the motor means will be broken whenever the switch means engages one of the stop devices in its said first position.

2. The automatic dialing device of claim 1 wherein the spring means is adapted to return the dial of the telephone to its extreme counterclockwise position when the motor means is deenergized, and wherein there are ten stop devices circumferentially spaced around the dial-engaging means at positions adjacent the finger holes of the dial of a dial-operated system when it is in its extreme counterclockwise position.

3. The automatic dialing device of claim 1 wherein the motor means is provided with an armature clutch which will engage the motor means with the dial-engaging means when the motor means is energized to drive the dial-engaging means in said one direction, and which will disengage when the motor means is deenergized and the spring means urges the dial-engaging means in said opposite direction.

4. An automatic dialing device for dial-operated systems comprising rotary dial-engaging means, motor means adapted to drive said dial-engaging means in one direction, spring means urging said dial-engaging means in the opposite direction, normally closed switch means on the rotary dial-engaging means, radially-extending switch actuating means on the rotary dial-engaging means adapted to open said normally closed switch means upon movement of the switch actuating means in a direction opposite to said one direction, a plurality of stop devices circumferentially spaced around the axis of said rotary dial-engaging means, each of said stop devices having a first position in which it will engage the switch actuating means to open said normally closed switch means upon rotation of the dial-engaging means in said one direction and a second position in which it will not engage the switch actuating means, and circuit means for energizing said motor means and including said switch means, the arrangement being such that the circuit to the motor means will be broken whenever the switch means engages one of the stop devices in its said first position.

5. An automatic dialing device for dial-operated systems comprising a dial-engaging means rotatable about an axis coincident with the axis of the telephone dial, motor means adapted to drive said dial-engaging means in one direction, spring means urging the dial-engaging means in the opposite direction, switch means on the dial-engaging means, switch actuating means on the dial-engaging means, a plurality of stop devices circumferentially spaced around the axis of said dial-engaging means, each of said stop devices being movable along a path extending parallel to the axis of the dial-engaging means and having a first position in which it is in the path of travel of said switch actuating means and a second position in which it is out of said path of travel, and circuit means for energizing said motor means and including said switch means, the arrangement being such that the circuit to the motor means will be broken whenever the switch actuating means engages one of said stop devices in its path of travel.

6. An automatic dialing device for dial-operated systems comprising rotary dial-engaging means, motor means adapted to drive said dial-engaging means in one direction, spring means urging said dial-engaging means in the opposite direction, normally closed switch means on the dial-engaging means, radially-extending switch actuating means on the dial-engaging means, a plurality of stop devices circumferentially spaced around the axis of said dial-engaging means, each of said stop devices comprising a shaft extending parallel to the rotary axis of the dial-engaging means and movable from a first position where it is out of the path of travel of the switch actuating means to a second position where it is in the path of travel of the switch actuating means, a plurality of normally open switch devices each of which is adapted to be closed by movement of an associated one of the stop devices from its first position to its second position, and circuit means for energizing said motor means to drive the dial-engaging means in said one direction and including a closed one of said normally open switch devices and the normally closed switch means on the dial-engaging means, the arrangement being such that upon movement of any one of the stop devices from its first position to its second position its associated normally upon switch device will be closed to energize the motor means, whereupon the dial-engaging means will be rotated in said one direction until the switch actuating means engages said any one stop device to open the normally closed switch means and deenergize the motor to permit said spring means to rotate the dial-engaging means in said opposite direction.

7. An automatic dialing device for dial telephones comprising rotary dial-engaging means, motor means adapted to drive said dial-engaging means in one direction, spring means urging said dial-engaging means in the opposite direction, normally closed switch means on the dial-engaging means, radially-extending switch actuating means on the dial-engaging means, a plurality of stop devices circumferentially spaced around the axis of said dial-engaging means, each of said stop devices comprising a solenoid having an armature extending therethrough parallel to the rotary axis of the dial-engaging means and movable from a first position where its one end is out of the path of travel of the switch actuating means to a second position where its said one end is in the path of travel of the switch actuating means, a plurality of normally open switch devices each of which is adapted to be closed by movement of an associated one of said armatures from its first position to its second position, and circuit means for energizing said motor means and one of said solenoids and including a closed one of said normally open switch devices and the normally closed switch means on the dial-engaging means, the arrangement being such that upon movement of any one of the armatures from its first position to its second position its associated normally open switch device will be closed to energize the solenoid for that armature and said motor means, whereupon the dial-engaging means will be rotated in said one direction until the switch actuating means engages the said one end of that armature to open the normally closed switch means and deenergize both the solenoid for that armature and said motor means to permit the spring means to rotate said dial-engaging means in said opposite direction.

8. An automatic dialing device for dial telephones comprising rotary dial-engaging means, motor means adapted to drive said dial-engaging means in one direction, spring means urging said dial-engaging means in the opposite direction, switch means on the dial-engaging means, radially-extending switch actuating means on the dial-engaging means, a plurality of solenoid devices circumferentially spaced around the axis of said dial-engaging means, armatures for the solenoid devices, each of said armatures being movable when the armature is energized into a position where it will engage said switch actuating means upon rotation of the dial-engaging means to thereby open said normally closed switch means, spring means for each of said armatures urging the armatures out of their positions where they will engage the switch actuating means, a normally open switch device associated with each of said armatures and adapted to be closed when its associated armature is in position to engage the switch actuating means, and circuit means for energizing said motor means including any one of said normally open switch devices and said normally closed switch means.

9. An automatic dialing device for dial telephones comprising rotary dial-engaging means, motor means adapted to drive said dial-engaging means in one direction, spring means urging said dial-engaging means in the opposite direction, normally closed switch means on the dial-engaging means, radially-extending switch actuating means on the dial-engaging means, a plurality of solenoid devices circumferentially spaced around the axis of said dial-engaging means, armatures for the solenoids, each of said armatures being movable when its solenoid is energized into a position where it will engage said switch actuating means upon rotation of the dial-engaging means to thereby open said normally closed switch means, spring means for each of said armatures urging the armatures out of their positions where they will engage the switch actuating means, a normally open switch device associated with each of said armatures and adapted to be closed when its associated armature is energized, circuit means for energizing said motor means including any one of said normally open switch devices and said normally closed switch means, apparatus for energizing selected ones of said solenoids in sequence comprising a card member having a plurality of physical means positioned thereon to indicate corresponding indicia to be dialed, reciprocating means movable across said card member in synchronism with said dial-engaging means and adapted to engage said physical means, and circuit means adapted to be operated by the engagement of said reciprocating means and said physical means to sequentially energize selected ones of the solenoid devices.

10. An automatic dialing device for dial telephones comprising rotary dial-engaging means, motor means adapted to drive said dial-engaging means in one direction, spring means urging said dial-engaging means in the opposite direction, normally closed switch means on the dial-engaging means, radially-extending switch actuating means on the dial-engaging means, a plurality of solenoid devices circumferentially spaced around the axis of said dial-engaging means, armatures for the solenoids, each of said armatures being movable when its armature is energized into a position where it will engage said switch actuating means upon rotation of the dial-engaging means to thereby open said normally closed switch means, spring means for each of said armatures urging the armatures out of their positions where they engage the switch actuating means, a normally open switch device associated with each of said armatures and adapted to be closed when its associated armature is energized, circuit means for energizing said motor including any one of said normally open switch devices and said normally closed switch means, apparatus for sequentially energizing selected ones of said solenoid devices and comprising a card member having a plurality of physical means positioned thereon to indicate corresponding indicia in a telephone number to be dialed, reciprocating electrical card scanning means movable across said card member, and means for moving said reciprocating means across the card member in steps, said latter-mentioned means being adapted to move the reciprocating means through one step each time the dial-engaging means is rotated in said opposite direction by the spring means.

11. An automatic dialing device for dial-operated systems comprising rotary dial-engaging means, switch means on the rotary dial-engaging means, a plurality of stop devices circumferentially spaced around the axis of said rotary dial-engaging means, each of said stop devices having a first position in which it will engage the switch means upon rotation of the rotary dial-engaging means and a second position in which it will not engage the switch means, motor means for rotating the dial-engaging means, and circuit means including said switch means for energizing the motor means to rotate the dial-engaging means in one direction until the switch means engages one of the stop devices in its said first position to at least momentarily deenergize the motor means.

References Cited in the file of this patent

UNITED STATES PATENTS

| | | |
|---|---|---|
| 2,088,065 | Holden et al. | July 27, 1937 |
| 2,272,089 | La Guardia | Feb. 3, 1942 |
| 2,579,983 | Thornton | Dec. 25, 1951 |
| 2,656,417 | Kilburg | Oct. 20, 1953 |
| 2,949,508 | Rettie et al. | Aug. 16, 1960 |